United States Patent
Kato et al.

(10) Patent No.: US 11,027,669 B1
(45) Date of Patent: Jun. 8, 2021

(54) CONTROL DEVICE

(71) Applicant: TOYOTA JIDOSHA KABUSHIKI KAISHA, Aichi-ken (JP)

(72) Inventors: Wataru Kato, Toyota (JP); Yuko Asano, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/114,371

(22) Filed: Dec. 7, 2020

(30) Foreign Application Priority Data

Dec. 9, 2019 (JP) .............................. JP2019-221933

(51) Int. Cl.
*B60R 11/04* (2006.01)
*B60R 16/023* (2006.01)

(52) U.S. Cl.
CPC .......... *B60R 11/04* (2013.01); *B60R 16/0231* (2013.01); *B60R 2300/40* (2013.01); *B60R 2300/8093* (2013.01)

(58) Field of Classification Search
CPC . B60R 11/04; B60R 16/0231; B60R 2300/40; B60R 2300/8093
See application file for complete search history.

(56) References Cited

U.S. PATENT DOCUMENTS

| | | | | |
|---|---|---|---|---|
| 4,143,368 A | * | 3/1979 | Route | ................. B60R 25/1001 340/426.17 |
| 2004/0143695 A1 | * | 7/2004 | Hashimoto | ......... F02D 41/2496 711/1 |
| 2005/0003844 A1 | * | 1/2005 | Nishiga | ................. H04W 84/18 455/517 |
| 2007/0250452 A1 | * | 10/2007 | Leigh | .................... B67D 7/348 705/65 |

(Continued)

FOREIGN PATENT DOCUMENTS

| | | |
|---|---|---|
| JP | 200370175 A | 3/2003 |
| JP | 2014150664 A | 8/2014 |

OTHER PUBLICATIONS

Unpublished U.S. Appl. No. 17/017,689, filed Sep. 11, 2020, 23pp.

(Continued)

*Primary Examiner* — James M Pontius
(74) *Attorney, Agent, or Firm* — Hauptman Ham, LLP

(57) ABSTRACT

A control device is installed in a vehicle including an electrical storage device to which is connected a plurality of electrical paths. The vehicle includes an external signal recognition device that recognizes a predetermined image or signal based on an image outside of the vehicle or a signal from outside of the vehicle, an external environment recognition device that recognizes a predetermined environment based on a surrounding environment of the vehicle when the predetermined image or signal is recognized by the external signal recognition device, regardless of whether a system of (Continued)

the vehicle is started, and a relay connected to at least one object electrical path. The control device includes a processor that turns the relay off when a count of times of the external environment recognition device continuously recognizing the predetermined environment for no shorter than a predetermined time is no less than a predetermined count of times.

5 Claims, 2 Drawing Sheets

(56) References Cited

U.S. PATENT DOCUMENTS

| | | | | |
|---|---|---|---|---|
| 2010/0286887 | A1* | 11/2010 | Maruyama | B60W 10/184 |
| | | | | 701/96 |
| 2014/0217812 | A1 | 8/2014 | Sugiyama et al. | |
| 2015/0340884 | A1* | 11/2015 | Suzuki | H02J 7/1423 |
| | | | | 320/107 |
| 2016/0185218 | A1* | 6/2016 | Itoo | B60K 17/34 |
| | | | | 180/247 |
| 2017/0272009 | A1* | 9/2017 | Kawamura | B60L 3/12 |
| 2017/0332010 | A1* | 11/2017 | Asakura | G05D 1/0223 |
| 2018/0126930 | A1* | 5/2018 | Ando | H04L 67/12 |
| 2020/0031273 | A1* | 1/2020 | An | H04N 7/181 |
| 2020/0167574 | A1* | 5/2020 | Kumano | B60R 11/04 |
| 2020/0310427 | A1* | 10/2020 | Oyama | B60W 60/00 |

OTHER PUBLICATIONS

Unpublished U.S. Appl. No. 17/096,965, filed Nov. 13, 2020, 36pp.

* cited by examiner

CONTROL DEVICE

CROSS-REFERENCE TO RELATED APPLICATION

This application claims priority to Japanese Patent Application No. 2019-221933 filed on Dec. 9, 2019, incorporated herein by reference in its entirety.

BACKGROUND

1. Technical Field

The present disclosure relates to a control device installed in a vehicle that has an electrical storage device.

2. Description of Related Art

There has been proposed, as a control device of this type, one installed in a vehicle (electric vehicle) that has an electrical storage device (main battery) (see Japanese Unexamined Patent Application Publication No. 2014-150664 (JP 2014-150664 A) for example). The electrical storage device is connected to a plurality of electrical paths (positive lines and negative lines). In this device, a user removes a fuse attached to an electrical path connected to an accessory load out of the electric paths, thereby cutting off this electrical path. This reduces dark current.

SUMMARY

Under special circumstances that differ from normal usage states of vehicles, such as when a vehicle is not used for a long time due to being transported or the like, reducing dark current is desirable, to suppress drop in the charge of the electrical storage device during the period in which the vehicle is not being used. In the above control device, the user cuts off the electrical path by removing the fuse. However, the user may forget to remove the fuse, resulting in the charge of the electrical storage device dropping. Accordingly, cutting off the electrical path in a more sure manner, to reduce dark current in a more sure manner, is desired.

The present disclosure provides a control device configured to reduce dark current in a more sure manner.

A control device according to an aspect of the present disclosure is installed in a vehicle including an electrical storage device to which is connected a plurality of electrical paths. The vehicle includes an external signal recognition device configured to recognize a predetermined image or a predetermined signal based on an image outside of the vehicle or a signal from outside of the vehicle, an external environment recognition device configured to recognize a predetermined environment based on a surrounding environment of the vehicle when the predetermined image or the predetermined signal is recognized by the external signal recognition device, regardless of whether a system of the vehicle is started, and a relay connected to at least one object electrical path of the electrical paths. The control device includes a processor configured to turn the relay off when a count of times of the external environment recognition device continuously recognizing the predetermined environment for no shorter than a predetermined time is no less than a predetermined count of times.

In the control device according to the aspect of the present disclosure, the relay is turned off when a count of times of the external environment recognition device continuously recognizing the predetermined environment for no shorter than a predetermined time is no less than a predetermined count of times. Accordingly, the relay can be turned off upon having appropriately recognized the state of the vehicle. Consequently, dark current can be appropriately suppressed. The "predetermined image or predetermined signal" here may be an image or signal set beforehand as a unique image or signal that would not be encountered in normal vehicle driving environments, or the like, such as on in-town roads or on freeways. The "predetermined environment" may be an environment set beforehand as a unique environment or the like, encountered when the vehicle is being shipped by a car carrier vessel or a car carrier train or the like.

In the control device according to the aspect of the present disclosure, the external signal recognition device may be configured to recognize, as the predetermined image, at least one of an image of a one-dimensional code, an image of a two-dimensional code, and a plurality of image patterns. In the control device according to the aspect of the present disclosure, the external signal recognition device can recognize the predetermined image in a more sure manner.

In the control device according to the aspect of the present disclosure, the external signal recognition device may be configured to recognize, as the predetermined signal, a light signal where light is emitted at a different frequency from a household alternating current (AC) power frequency, or a light signal where light is emitted at a predetermined pattern at a frequency different from the household AC power frequency. In the control device according to the aspect of the present disclosure, the external signal recognition device can recognize the predetermined signal in a more sure manner. The "predetermined pattern" may be a pattern where two or more frequencies that differ from the household AC power frequency alternate repeatedly, or the like.

Further, in the control device according to the aspect of the present disclosure, the external environment recognition device may be configured to recognize at least one of an inter-vehicular distance between the vehicle and an adjacent vehicle being shorter than a predetermined distance, the vehicle vibrating at a predetermined vibration, an inclination of the vehicle being no smaller than a predetermined inclination, an acceleration of the vehicle being a predetermined acceleration, and sound outside of the vehicle being a predetermined sound, as the predetermined environment. In the control device according to the aspect of the present disclosure, the external environment recognition device can recognize the predetermined environment in a more sure manner. The "predetermined distance" may be a distance or the like set beforehand as an inter-vehicular distance shorter than that which the vehicle would encounter in a normal parking environment in town or at home or the like. The "predetermined vibration" may be a vibration set beforehand as a vibration or the like that the vehicle would not encounter in a normal parking environment, but as a vibration unique to when the vehicle is being shipped by a car carrier train or a car carrier vessel or the like. The "predetermined inclination" may be an inclination set beforehand as an inclination that the vehicle would not encounter in a normal parking environment, but is an inclination unique to when the vehicle is being shipped by a car carrier train or a car carrier vessel or the like. The "predetermined acceleration" may be an acceleration set beforehand as an acceleration that the vehicle would not encounter in a normal parking environment, but is an acceleration unique to when the vehicle is being shipped by a car carrier train or a car carrier vessel or the like. The "predetermined sound" may be a sound set beforehand as a sound that the vehicle would not encounter in a normal parking environment, but is a sound unique to when the vehicle is being shipped by a car carrier train or a car carrier vessel or the like.

Further, in the control device according to the aspect of the present disclosure, the vehicle may include at least one electrical component that does not need supply of power when the vehicle is parked during shipping, but needs supply of power when parked other than during shipping. The object electrical path may be connected to the electrical storage device and to the electrical component. In the control device according to the aspect of the present disclosure, the electrical path can be cut off more appropriately.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment for carrying out the present disclosure will be described below by way of examples, with reference to the drawings.

Figure 1:
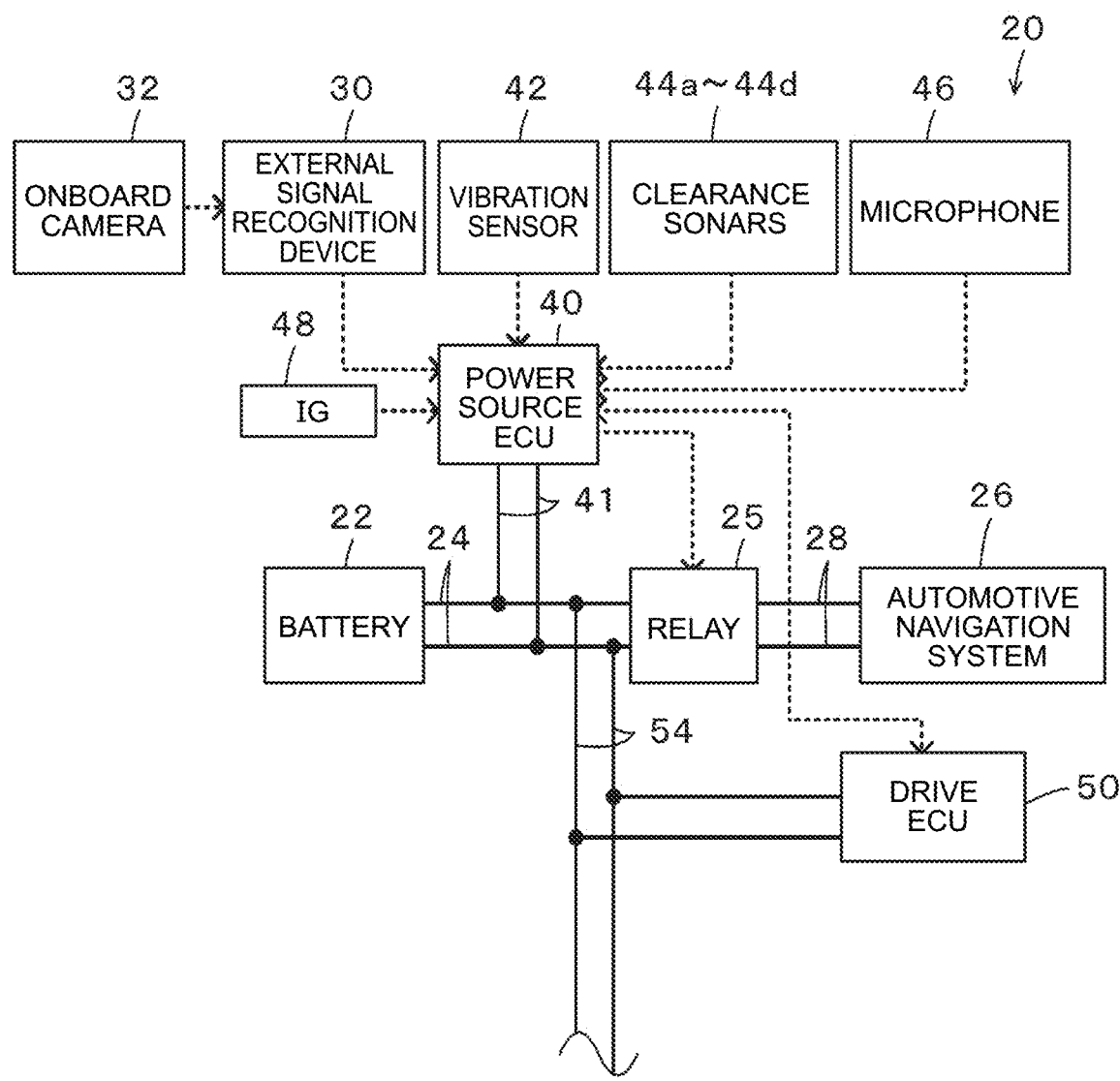
FIG. 1 is a configuration diagram schematically illustrating a configuration of an automobile 20 in which is installed a control device according to an embodiment of the present disclosure.

FIG. 1 is a configuration diagram schematically illustrating the configuration of an automobile 20 in which is installed a control device according to an embodiment of the present disclosure. The automobile 20 is configured as an electric vehicle that is capable of traveling under power from a motor driven by electric power from a traction battery, which is omitted from illustration. The automobile 20 includes a battery 22, a relay 25, an external signal recognition device 30, and a power source electronic control unit (hereinafter referred to as "power source ECU") 40.

The battery 22 is configured as a lithium-ion secondary cell that has a lower rated voltage than the traction battery, which is omitted from illustration. Power lines (electrical paths) from a plurality of electrical components are connected to the battery 22 via power lines (electrical paths) 24. Examples of the electrical components include an automotive navigation system 26, the power source ECU 40, a drive electronic control unit (hereinafter referred to as "drive ECU") 50 that controls a drive system such as motors, the external signal recognition device 30, an onboard camera 32, a vibration sensor 42, clearance sonars 44a through 44d, a microphone 46, and so forth. Connected to the battery 22 via the power lines (electrical paths) 24 are power lines (electrical paths) 28 connected to the automotive navigation system 26, power lines (electrical paths) 41 connected to the power source ECU 40, power lines (electrical paths) 54 connected to the drive ECU 50, and although omitted from illustration, power lines (electrical paths) each connected to the external signal recognition device 30, the onboard camera 32, the vibration sensor 42, the clearance sonars 44a through 44d, and the microphone 46. The battery 22 supplies power to the power lines 24 regardless of whether the system of the vehicle is started.

The relay 25 is attached to the power lines 28.

The external signal recognition device 30 is configured as a microcontroller configured primarily of a central processing unit (CPU) that is omitted from illustration, and including, besides the CPU, read-only memory (ROM) to store processing programs, random access memory (RAM) to temporarily store data, input and output ports, a communication port (all omitted from illustration), and so forth. When the system starts up, image signals from the onboard camera 32 that photographs outside of the vehicle every predetermined time interval (e.g., every 0.5 seconds) are input to the external signal recognition device 30 via the input port.

The external signal recognition device 30 matches the images outside of the vehicle based on the image signals from the onboard camera 32 with a predetermined image imref stored in the ROM beforehand, and when the image outside of the vehicle matches the predetermined image imref, determination is made that the predetermined image imref has been recognized. The predetermined image imref may be one image set beforehand as a unique image (e.g., an image of a two-dimensional code or one-dimensional code or the like) that would not be encountered in normal vehicle driving environments, such as on in-town roads or on freeways, or a plurality of image patterns set beforehand. In an example, the predetermined image imref is a QR code (registered trademark) image set beforehand.

The power source ECU 40 is configured as a microcontroller configured primarily of a CPU (a processor) that is omitted from illustration, and including, besides the CPU, ROM to store processing programs, RAM to temporarily store data, input and output ports, a communication port (all omitted from illustration), and so forth.

Signals from various types of sensors are input to the power source ECU 40 via the input port. Examples of signals input to the power source ECU 40 include vehicle vibrations Vib from the vibration sensor 42 that serves as an acceleration sensor that can detect vibrations of the vehicle, detection signals Sca through Scd from the clearance sonars 44a through 44d attached to the four corners of the vehicle, sound signals Sm from the microphone 46 that is attached within the vehicle cabin and detects sound, and so forth. Another example is an ignition signal Sig from an ignition switch (IG) 48. Further examples include recognition results Re from the external signal recognition device 30, and so forth. Various types of control signals are output from the output port of the power source ECU 40. Examples of signals output from the power source ECU 40 include drive control signals to the relay 25, and so forth. The power source ECU 40 transmits various types of data to the drive ECU 50 and receives various types of data from the drive ECU 50 through communication. The power source ECU 40 is supplied with power from the battery 22 and operates, regardless of whether the system of the vehicle is started.

The power source ECU 40 computes distances Lfl, Lfr, Lrl, and Lrr to objects (obstructions) situated in the directions of the four corners, based on the detection signals Sca through Scd from the clearance sonars 44a through 44d attached to the four corners of the vehicle.

Figure 2:
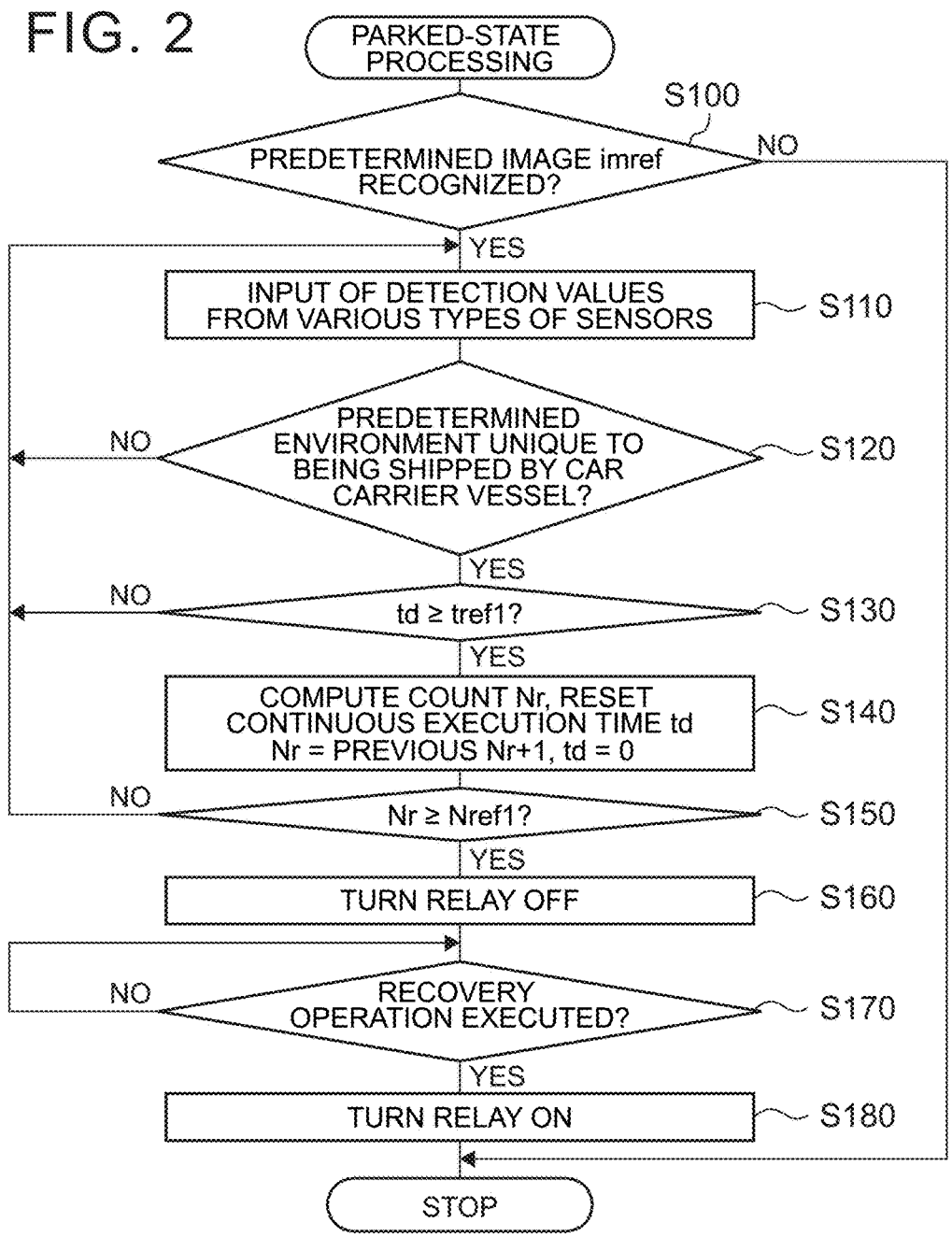
FIG. 2 is a flowchart illustrating an example of a parked-state processing routine executed by a power source ECU 40.

Next, operations of the automobile 20 configured in this way, and in particular, operations of the automobile 20 when a manufacturer has loaded the vehicle in a car carrier vessel and is shipping for long distances, will be described. FIG. 2 is a flowchart illustrating an example of a parked-state processing routine executed by the power source ECU 40.

This routine is executed when the vehicle is parked in a state where the ignition switch 48 is turned off and the system is shut down. Note that even when the system of the vehicle is shut down, the automotive navigation system 26, external signal recognition device 30, onboard camera 32, power source ECU 40, vibration sensor 42, clearance sonars 44a through 44d, microphone 46, and drive ECU 50 operate under power supplied from the battery 22.

When this routine is executed, the CPU in the power source ECU 40 determines whether the external signal recognition device 30 has recognized the predetermined image imref based on the recognition results Re from the external signal recognition device 30 (step S100). Now, description regarding the inside of the car carrier vessel will be described.

Figure 3:
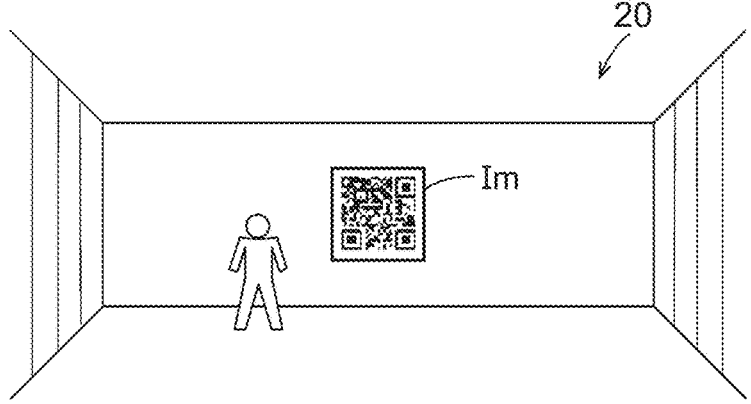
FIG. 3 is an explanatory diagram for describing inside of a car carrier vessel.

FIG. 3 is an explanatory diagram for describing the inside of the car carrier vessel. A matching image Im that is the same as the predetermined image imref stored beforehand in the ROM of the external signal recognition device 30 is displayed inside the car carrier vessel, as illustrated in FIG. 3. The vehicle enters into the car carrier vessel through an entrance of the car carrier vessel, being driven by an employee of the manufacturer or the like, while taking images of the outside of the vehicle by the onboard camera 32. The vehicle is driven through the car carrier vessel, is stopped at a predetermined parking position, and thereafter the ignition switch 48 is turned off and the system is shut down. At this time, the matching image Im is in an image captured by the onboard camera 32. The external signal recognition device 30 accordingly inputs recognition results Re, indicating that the predetermined image imref is recognized, to the power source ECU 40. Accordingly, step S100 is processing for determining whether the vehicle has driven through the inside of the car carrier vessel.

When the external signal recognition device 30 does not recognize the predetermined image imref in step S100, determination is made that parking of the vehicle is being performed in a normal usage range of the user and is not parking for shipping by a carrier vessel, and the routine ends.

When the external signal recognition device 30 does recognize the predetermined image imref in step S100, determination is made that parking of the car is not being performed in a normal usage range of the user but rather is parking for shipping by a carrier vessel. Subsequently, vehicle vibrations Vib from the vibration sensor 42, computed distances Lfl, Lfr, Lrl, and Lrr to objects (obstructions) from the four corners of the vehicle, and sound signals Sm from the microphone 46, are input as detection values of various types of sensors (step S110).

Next, determination is made regarding whether the surrounding environment has been recognized as being a predetermined environment unique to being shipped by a car carrier vessel, based on the detection values of the various types of sensors that have been input (step S120). In step S120, determination is made that the surrounding environment has been recognized as being a predetermined environment unique to being shipped by a car carrier vessel when at least one of the following three conditions is satisfied. The first condition is that the vehicle vibrations Vib are vibrations unique to those of a vehicle loaded on a car carrier vessel at sea. The second condition is that at least one of the distances Lfl, Lfr, Lrl, and Lrr to objects (obstructions) from the four corners of the vehicle is smaller than a predetermined distance, (e.g., 20 cm, 25 cm, 30 cm, or the like). The third condition is that the sound signals Sm from the microphone 46 are signals indicating sound unique to that detected by a vehicle loaded on a car carrier vessel at sea.

When the surrounding environment is not the predetermined environment in step S120, determination is made that there is a possibility that the vehicle currently is not being shipped in a car carrier vessel. The flow returns to the processing of step S110, and steps S110 and S120 are repeated until the surrounding environment is recognized as being the predetermined environment unique to being shipped by a car carrier vessel in step S120.

When the surrounding environment is found to be the predetermined environment unique to being shipped in step S120, determination is made that the probability that the vehicle currently is being shipped in a car carrier vessel is very high. Determination is then made regarding whether a continuous execution time td where the determination of continuously executing the determination in step S120 is no shorter than a predetermined time tref1 (step S130). The predetermined time tref1 is set to, for example, 25 minutes, 30 minutes, 35 minutes, or the like.

When the continuous execution time td is shorter than the predetermined time tref1, the flow returns to step S110, and the processing of steps S110 through S130 is repeated until the continuous execution time td is no shorter than the predetermined time tref1 in step S130. Note that when the surrounding environment is not found to be the predetermined environment unique to being shipped in step S120, the value of the continuous execution time td is reset to a zero value.

When the continuous execution time td is no shorter than the predetermined time tref1 in step S130, next, a count Nr is computed by incrementing a previous value (previous Nr) of a count of the continuous execution time td being no shorter than the predetermined time tref1 by 1, and the value of the continuous execution time td is reset to zero (step S140). The previous Nr is set to a zero value when step S140 is executed the first time after the system of the vehicle has been shut down.

Next, determination is made regarding whether the count Nr is no smaller than a predetermined count Nref1 (step S150). The predetermined count Nref1 is a threshold value for determining whether it is appropriate to finalize that the vehicle is currently being shipped by a car carrier vessel, and is set to, for example, four times, five times, six times, or the 1 like.

When the count Nr is smaller than the predetermined count Nref1 in step S150, determination is made that finalization that the vehicle is currently being shipped by a car carrier vessel cannot be made. The flow then returns to step S110, and the processing of steps S110 through S150 is repeated until the count Nr is no smaller than the predetermined count Nref1 in step S150.

When the count Nr is no smaller than the predetermined count Nref1 in step S150, determination is made that finalization that the vehicle is currently being shipped by a car carrier vessel can be made, and a drive control signal is transmitted to the relay 25 to turn the relay 25 off (step S160). The relay 25 is turned off by the drive control signal, upon having finalized that the vehicle is currently being shipped by a car carrier vessel. Accordingly, the power lines 28 can be cut off in a sure manner as compared to manually removing the fuse, and supply of power from the battery 22 to the automotive navigation system 26 can be cut off.

The reason why the relay 25 is turned off and supply of power from the battery 22 to the automotive navigation system 26 is cut off in step S160 is as follows. In a normal usage range of the user, when the vehicle is not being shipped, setting of destinations to the automotive navigation system 26 is often performed while parked. Accordingly, it would be better to supply power to the automotive navigation system 26 when the vehicle is parked by not being shipped. When the vehicle is being shipped by a car carrier vessel, there is no route guidance to be performed by the automotive navigation system 26, so there is no problem with cutting off power to the automotive navigation system 26 and shutting down the automotive navigation system 26. That is to say, the automotive navigation system 26 does not need supply of power when the vehicle is parked during shipping, but needs supply of power when the vehicle is parked other than during shipping. Turning the relay 25 off in step S160 eliminates electric power consumption by the automotive navigation system 26 due to cutting off supply of power, so dark current can be reduced in a more sure manner, and the battery 22 can be suppressed from going dead in a more sure manner.

After turning the relay 25 off in this way, determination is made next regarding whether a recovery operation has been performed (step S170). The recovery operation is an operation set beforehand as an operation to be performed by an employee of the manufacturer or the like to restore the relay 25 to on again, such as when the vehicle is to be temporarily unloaded from the car carrier vessel, when the parked position of the vehicles is to be changed, or the like, during a long shipment of the vehicle on the car carrier vessel. The recovery operation may be an operation where the ignition switch 48 is turned from off to on for no less than a predetermined count Nref2 times within a predetermined time period tref2, for example. The predetermined time period tref2 is set to, for example, 10 seconds, 15 seconds, 20 seconds, or the like. The predetermined count of Nref2 times is set to, for example, three times, four times, five times, or the like.

When the recovery operation is not executed in step S170, step S170 is repeated, and the flow stands by in a state where the relay 25 is off.

When the recovery operation is executed in step S170, the relay 25 is turned on (step S180), and the routine ends. Thus, execution of the recovery operation turns the relay 25 on, so at times such as, during a long shipment on the car carrier vessel, when the vehicle is to be temporarily unloaded from the car carrier vessel or when the parked position of the vehicles is to be changed the relay 25 can be turned on and the vehicle can be driven.

According to the automobile 20 in which the control device according to the example described above is installed, the relay 25 is turned off when the count Nr of continuously recognizing the predetermined environment unique to shipping for no shorter than the predetermined time tref1 is no less than the predetermined count Nref1, whereby dark current can be suppressed in a more sure manner.

The external signal recognition device 30 can recognize an image of a one-dimensional code or an image of a two-dimensional code, and a plurality of image patterns, as the predetermined image imref. Accordingly, the external signal recognition device 30 can recognize the predetermined image imref in a more sure manner.

Also, the power source ECU 40 recognizes that the surrounding environment is the predetermined environment unique to shipping when at least one of the first condition that the vehicle vibrations Vib are vibrations unique to those of a vehicle loaded on a car carrier vessel at sea, the second condition that at least one of the distances Lfl, Lfr, Lrl, and Lrr to objects (obstructions) from the four corners of the vehicle is smaller than a predetermined distance, (e.g., 20 cm, 25 cm, 30 cm, or the like), and the third condition that the sound signals Sm from the microphone 46 are signals indicating sound unique to that detected by a vehicle loaded on a car carrier vessel at sea, is satisfied. Accordingly, the predetermined environment can be recognized in a more sure manner.

Further, the relay 25 is attached to the power lines (electrical paths) 28 to the automotive navigation system 26 that does not need supply of power when parked during shipping but needs supply of power when parked other than during shipping. Accordingly, a more appropriate cutoff of power lines (electrical paths) can be performed.

According to the automobile 20 in which the control device according to the example is installed, the external signal recognition device 30 can recognize at least one of an image of a one-dimensional code, an image of a two-dimensional code, and a plurality of image patterns, as the predetermined image imref, and the predetermined image imref is displayed within the car carrier vessel. However, an arrangement may be made where the external signal recognition device 30 is capable of recognizing light signals where light is emitted at a different frequency (e.g., 110 Hz, 170 Hz, etc.) from the two frequencies for household AC power in Japan (50 Hz and 60 Hz), or light signals where light is emitted at a predetermined pattern at a frequency different from household AC power frequencies, as the predetermined signals, and a device that emits such light signals may be installed within the carrier vessel. Light signals where light is emitted at a predetermined pattern at a frequency different from household AC power frequencies may be, for example, light signals where light emission at a first frequency (e.g., 110 Hz) and light emission at a second frequency (e.g., 170 Hz) are alternated at predetermined time periods. The first frequency and the second frequency may be frequencies that differ from an integer multiple of household AC power frequencies (100 Hz, 150 Hz, 200 Hz, and so forth, for the frequency of 50 Hz, and 120 Hz, 180 Hz, 240 Hz, and so forth, for the frequency of 60 Hz). Also, the first frequency and the second frequency may be selected such that the first frequency and the second frequency are frequencies that differ from an integer multiple of household AC power frequencies, and further are frequencies where the sum of the first frequency and the second frequency differs from an integer multiple of household AC power frequencies. Generally, frequencies commonly used for signals in town are the same as or integer multiples of a household AC power frequency. Accordingly, using the predetermined signals that are the same as a household AC power frequency or the same as an integer multiple of a household AC power frequency, or using predetermined signals where the sum of the first frequency and the second frequency is an integer multiple of a household AC power frequency, may result in recognizing a common signal in town as being the predetermined signal in step S100 of the parking-state processing routine exemplified in FIG. 2, and erroneously recognizing that the vehicle is driving inside a car carrier vessel. Such erroneous recognition can be suppressed by using predetermined signals of frequencies such as described above.

With regard to the automobile 20 in which the control device according to the example is installed, the predetermined image imref is displayed within the car carrier vessel. However, it is sufficient for the predetermined image imref to be displayed at a location allowing the onboard camera 32 to capture that image while the vehicle is being driven to the car carrier vessel. For example, the predetermined image imref may be displayed near the entrance to the car carrier vessel, or may be displayed at the entrance to the port where the car carrier vessel is docked. When there is a particular route that the vehicle travels to the car carrier vessel, the predetermined image imref may be displayed at a location allowing the onboard camera 32 to capture that image, such as on a building or on the road on the particular route.

According to the automobile 20 in which the control device according to the example is installed, the surrounding environment is recognized as being the predetermined environment unique to being shipped when at least one of the first condition through the third condition is satisfied in step S120 of the parked-state processing routine exemplified in FIG. 2. However, arrangements may be made where the surrounding environment is recognized as being the predetermined environment unique to being shipped only when two of the first condition through the third condition are satisfied, or when all three of the first condition through the third condition are satisfied. Further, these three conditions do not all have to be used, and arrangements may be made where the surrounding environment is recognized as being the predetermined environment unique to being shipped when just the first condition or just the second condition is satisfied, for example.

According to the automobile 20 in which the control device according to the example is installed, determination is made regarding whether the surrounding environment has been recognized as being a predetermined environment unique to being shipped by a car carrier vessel in step S120 of the parked-state processing routine exemplified in FIG. 2, based on the vehicle vibrations Vib, the distances Lfl, Lfr, Lrl, and Lrr to objects (obstructions) from the four corners of the vehicle, detected by the clearance sonars 44$a$ through 44$d$, and the sound signals Sm from the microphone 46. However, inclination of the vehicle, detected by a sensor that detects inclination of the vehicle as to the pavement or the parking surface of a car carrier vessel, and acceleration of the vehicle detected by an acceleration sensor that detects acceleration, may be used in addition to the detection values of these sensors, or instead of the detection values of these sensors. In this case, the inclination of the vehicle being no smaller than a predetermined inclination may be a fourth condition, and the acceleration of the vehicle being a predetermined acceleration may be a fifth condition. When taking the fourth and fifth conditions into consideration in addition to the first through third conditions, determination may be made regarding that the surrounding environment has been recognized as being a predetermined environment unique to being shipped by a car carrier vessel when at least one of the first through fifth conditions is satisfied.

In the automobile 20 in which the control device according to the example is installed, the present disclosure has been exemplified with regard to application to a shipment form of the vehicle being shipped by a car carrier vessel. However, the shipment form of the vehicle is not limited to shipment by a car carrier vessel, and may be applied to other moving objects, such as shipment by a car carrier train, for example. In this situation, the predetermined image imref may be displayed at a location allowing the onboard camera 32 to capture that image, such as in the car carrier train, at a train station, or the like. Also, in step S120 of the parked-state processing routine exemplified in FIG. 2, it is sufficient for determination to be made regarding whether the surrounding environment has been recognized as being a predetermined environment unique to being shipped by a moving object, based on detection values of the various types of sensors that have been input. For example, when the moving object is a car carrier train, in step S120 the first condition may be that the vehicle vibrations Vib are vibrations unique to a vehicle loaded on a car carrier train traveling on rails (e.g., vibrations that periodically occur due to rail joints). The third condition may be that the sound signals Sm from the microphone 46 are signals indicating a sound unique to a vehicle loaded on a car carrier train traveling on rails (e.g., a sound that periodically occurs due to rail joints). Further, application is not limited to such times of shipping, and may be applied to any special situation in which the vehicle is placed, that differs from normal usage situations of the vehicle.

According to the automobile 20 in which the control device according to the example is installed, the relay 25 is attached to the power lines 28 of the automotive navigation system 26. However, the relay 25 may be attached to power lines (electrical paths) to other electrical components that do not need supply of electric power when parked during shipping but need supply of electric power when parked at times other than during shipping. Examples of other electrical components include a dashcam, a meter, a clock, a tilt mechanism that adjusts the angle of the steering wheel, a telescopic mechanism that adjusts the front-rear position of the steering wheel, a sliding roof mechanism, seat memory that stores seat position in accordance with users, various types of electronic control units (ECUs) that do not have to be supplied with electric power during shipping, such as an entertainment electronic control unit (entertainment ECU) or a communication electronic control unit (communication ECU) that governs communication, a data communication module (DCM) that transmits information regarding the vehicle to a traffic information management center and receives traffic information from the traffic information management center, a wireless charger provided onboard to charge wireless devices such as smartphones or the like, and so forth. Also, at least one object electrical component to which electric power is not supplied under a special situation that differs from normal usage situations of the vehicle may be decided beforehand, and the relay may be attached to power lines (object electrical paths) connecting between the object electrical component and the electrical storage device.

The automobile 20 in which the control device according to the example is installed uses the battery 22 made up of a lithium-ion secondary cell as the electrical storage device. However, the secondary cell making up the battery 22 may be a secondary cell other than a lithium-ion secondary cell, such as a lead acid battery or the like, for example. Further, a capacitor may be used instead of the battery 22.

Correlation between principal elements of the example and principal elements of the present disclosure described in the SUMMARY will be described. In the example, the external signal recognition device 30 can be understood to be an "external signal recognition device", the power source ECU 40 can be understood to be an "external environment recognition device", the relay 25 can be understood to be a "relay", and the power source ECU 40 can be understood to be a "control device".

Note that the correlation between principal elements of the example and principal elements of the present disclosure described in the SUMMARY does not limit the elements of the present disclosure described in the SUMMARY, since the example is an exemplification for describing a specific embodiment for carrying out the present disclosure described in SUMMARY. That is to say, interpretation of the present disclosure described in the SUMMARY should be made based on the description therein, and the example is only a specific exemplification of the present disclosure described in the SUMMARY.

Although an embodiment of carrying out the present disclosure has been described by way of an example, the applicable embodiment is in no way limited to the example, and it is needless to say the present disclosure can be carried out by various embodiments without departing from the essence thereof.

The present disclosure is applicable to manufacturing industries of control devices, and so forth.

What is claimed is:

1. A control device installed in a vehicle including an electrical storage device to which is connected a plurality of electrical paths,
the vehicle including
an external signal recognition device configured to recognize a predetermined image or a predetermined signal based on an image outside of the vehicle or a signal from outside of the vehicle,
an external environment recognition device configured to recognize a predetermined environment based on a surrounding environment of the vehicle when the predetermined image or the predetermined signal is recognized by the external signal recognition device, regardless of whether a system of the vehicle is started, and
a relay connected to at least one object electrical path of the electrical paths,
the control device comprising
a processor configured to turn the relay off when a count of times of the external environment recognition device continuously recognizing the predetermined environment for no shorter than a predetermined time is no less than a predetermined count of times.

2. The control device according to claim 1,
wherein the external signal recognition device is configured to recognize, as the predetermined image, at least one of an image of a one-dimensional code, an image of a two-dimensional code, and a plurality of image patterns.

3. The control device according to claim 1,
wherein the external signal recognition device is configured to recognize, as the predetermined signal, a light signal where light is emitted at a different frequency from a household alternating current power frequency, or a light signal where light is emitted at a predetermined pattern at a frequency different from the household alternating current power frequency.

4. The control device according to claim 1,
wherein the external environment recognition device is configured to recognize at least one of
an inter-vehicular distance between the vehicle and an adjacent vehicle being shorter than a predetermined distance,
the vehicle vibrating at a predetermined vibration,
an inclination of the vehicle being no smaller than a predetermined inclination,
an acceleration of the vehicle being a predetermined acceleration, and
sound outside of the vehicle being a predetermined sound,
as the predetermined environment.

5. The control device according to claim 1,
wherein the vehicle includes at least one electrical component that does not need supply of power when the vehicle is parked during shipping, but needs supply of power when parked other than during shipping, and
wherein the object electrical path is connected to the electrical storage device and to the electrical component.

* * * * *